(12) United States Patent
Lee et al.

(10) Patent No.: US 10,178,602 B2
(45) Date of Patent: Jan. 8, 2019

(54) METHOD AND APPARATUS FOR INDICATING SKIPPING OF ACCESS CLASS BARRING IN WIRELESS COMMUNICATION SYSTEM

(71) Applicant: LG Electronics Inc., Seoul (KR)

(72) Inventors: Youngdae Lee, Seoul (KR); Jaehyun Kim, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 15/121,151

(22) PCT Filed: Mar. 11, 2015

(86) PCT No.: PCT/KR2015/002369
§ 371 (c)(1),
(2) Date: Aug. 24, 2016

(87) PCT Pub. No.: WO2015/137731
PCT Pub. Date: Sep. 17, 2015

(65) Prior Publication Data
US 2016/0381623 A1 Dec. 29, 2016

Related U.S. Application Data

(60) Provisional application No. 61/952,852, filed on Mar. 13, 2014.

(51) Int. Cl.
*H04W 48/02* (2009.01)
*H04W 48/12* (2009.01)
*H04W 4/14* (2009.01)
*H04W 72/04* (2009.01)

(52) U.S. Cl.
CPC ............. *H04W 48/02* (2013.01); *H04W 4/14* (2013.01); *H04W 48/12* (2013.01); *H04W 72/048* (2013.01)

(58) Field of Classification Search
CPC ....... H04W 48/02; H04W 48/12; H04W 4/14; H04W 72/048
USPC ................... 455/418, 414.1, 435.1; 370/252
See application file for complete search history.

(56) References Cited

U.S. PATENT DOCUMENTS

| | | | |
|---|---|---|---|
| 8,320,964 B2 | 11/2012 | Iwamura et al. | |
| 2012/0244853 A1* | 9/2012 | Iwamura | H04W 48/02 455/422.1 |
| 2012/0250626 A1 | 10/2012 | Iwamura et al. | |
| 2013/0294396 A1* | 11/2013 | Iwamura | H04W 72/04 370/329 |
| 2015/0049608 A1* | 2/2015 | Palm | H04W 76/10 370/230 |
| 2015/0223146 A1* | 8/2015 | Pinheiro | H04W 4/14 370/230 |

(Continued)

*Primary Examiner* — Michael Y Mapa
(74) *Attorney, Agent, or Firm* — Dentons US LLP (57) ABSTRACT

A method and apparatus for indicating skipping of access class barring (ACB) in a wireless communication system is provided. An upper layer of a user equipment (UE) receives ACB skip bits, which indicates whether ACB check is skipped for a specific application or service, from a lower layer of the UE, initiates the specific application of service, and transmits an ACB skip indication to the lower layer of the UE, if skipping of the ACK check is allowed for the specific application or service according to the ACB skip bits.

13 Claims, 8 Drawing Sheets

(56) References Cited

U.S. PATENT DOCUMENTS

2015/0257088 A1* 9/2015 Hsu .................. H04L 65/80
                                              370/328
2016/0066259 A1* 3/2016 Guo .................. H04W 76/10
                                              370/230

* cited by examiner

METHOD AND APPARATUS FOR INDICATING SKIPPING OF ACCESS CLASS BARRING IN WIRELESS COMMUNICATION SYSTEM

This application is a 35 USC § 371 National Stage entry of International Application No. PCT/KR2015/002369 filed on Mar. 11, 2015, and claims priority to U.S. Provisional Application Nos. 61/952,852 filed Mar. 13, 2014, all of which are hereby incorporated by reference in their entireties as if fully set forth herein.

BACKGROUND OF THE INVENTION

Field of the Invention

The present invention relates to wireless communications, and more particularly, to a method and apparatus for indicating skipping of access class barring (ACB) in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Internet protocol multimedia subsystem (IMS) multimedia telephony communication service allows multimedia conversational communication between two or more end points. An end point is typically located in a user equipment (UE), but can also be located in a network entity. As for traditional circuit-switched telephony, the protocols for the IMS multimedia telephony communication service allow a user to connect to any other user, regardless of operator and access technology. The IMS multimedia telephony communication service consists of two principal parts, which are a basic communication part, and an optional supplementary services part.

Various access control schemes may be defined in 3GPP LTE, one of which is a service specific access control (SSAC). For example, SSAC for the IMS multimedia telephony communication service may be performed. Further, for the specific application/service, access class barring (ACB) may be skipped. A method for indicating skipping of ACB for the specific application/service may be required.

SUMMARY OF THE INVENTION

The present invention provides a method and apparatus for indicating skipping of access class barring (ACB) in a wireless communication system. The present invention provides a method for skipping ACB for a specific application/service.

In an aspect, a method for indicating, by an upper layer of a user equipment (UE), skipping of access class barring (ACB) in a wireless communication system is provided. The method includes receiving, by the upper layer of the UE, ACB skip bits, which indicates whether ACB check is skipped for a specific application or service, from a lower layer of the UE, initiating, by the upper layer of the UE, the specific application of service, and transmitting, by the upper layer of the UE, an ACB skip indication to the lower layer of the UE, if skipping of the ACK check is allowed for the specific application or service according to the ACB skip bits.

In another aspect, a user equipment (UE) configure to indicate skipping of access class barring (ACB) in a wireless communication system is provided. The UE includes a radio frequency (RF) unit configured to transmit or receive a radio signal, and a processor coupled to the RF unit, and configured to receive, by an upper layer, ACB skip bits, which indicates whether ACB check is skipped for a specific application or service, from a lower layer of the UE, initiate, by the upper layer, the specific application of service, and transmit, by the upper layer, an ACB skip indication to the lower layer of the UE, if skipping of the ACK check is allowed for the specific application or service according to the ACB skip bits.

A radio resource control (RRC) layer of a user equipment (UE) can skip access class barring (ACB) for a specific application/service effectively.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
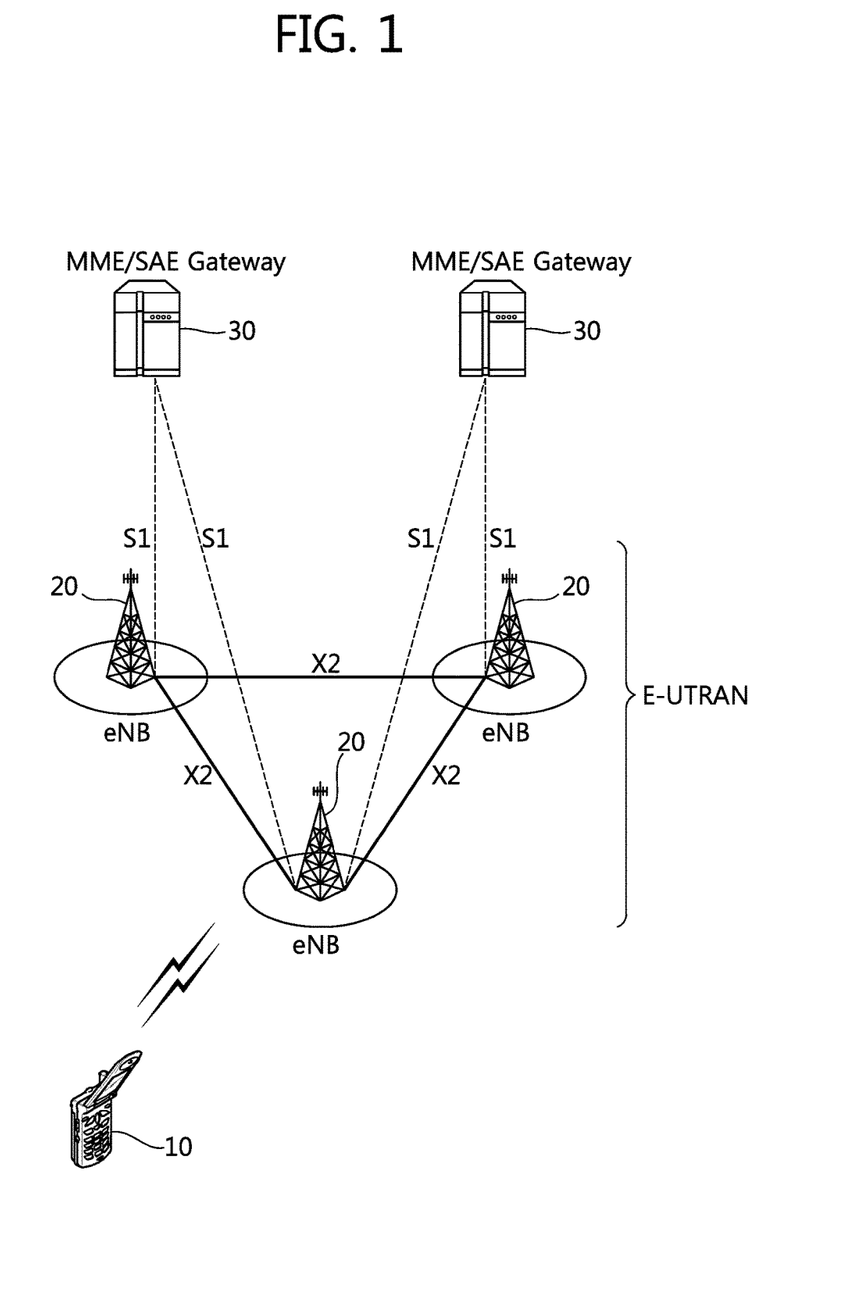
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
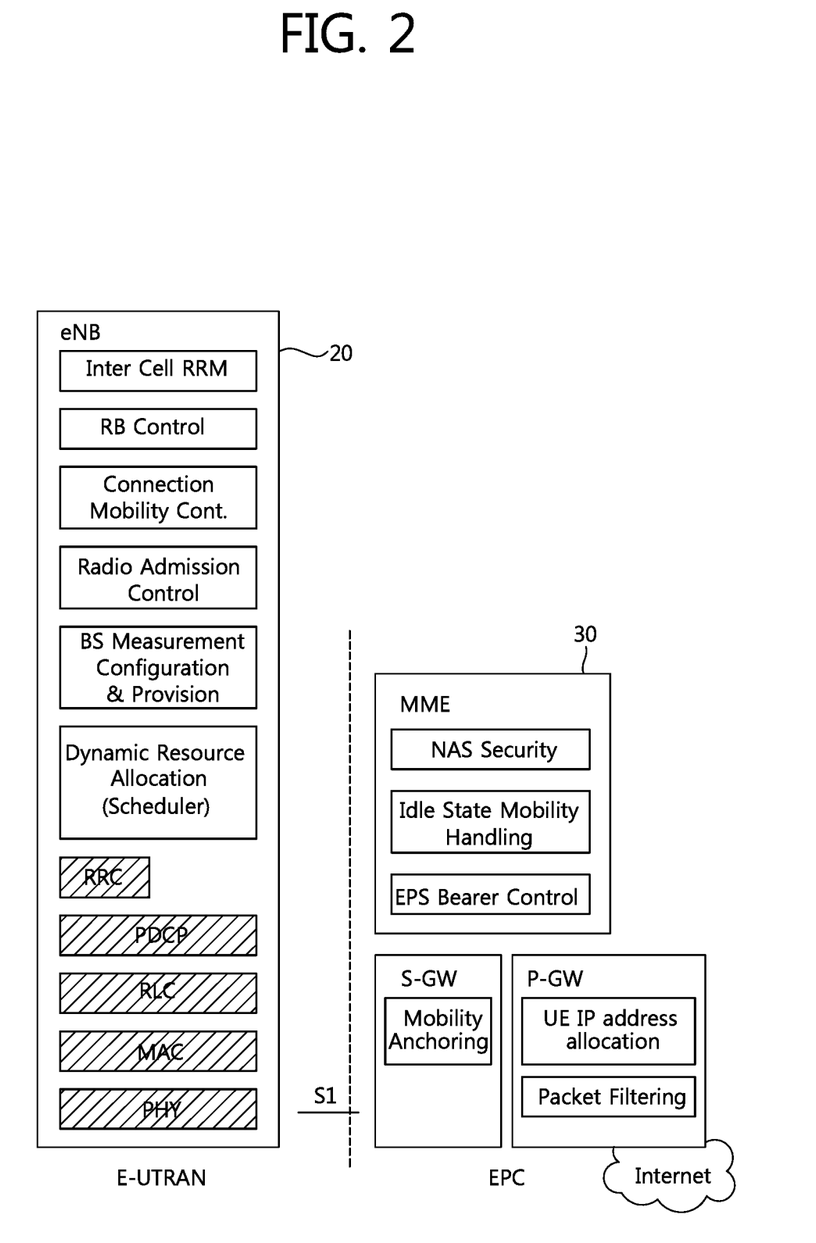
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
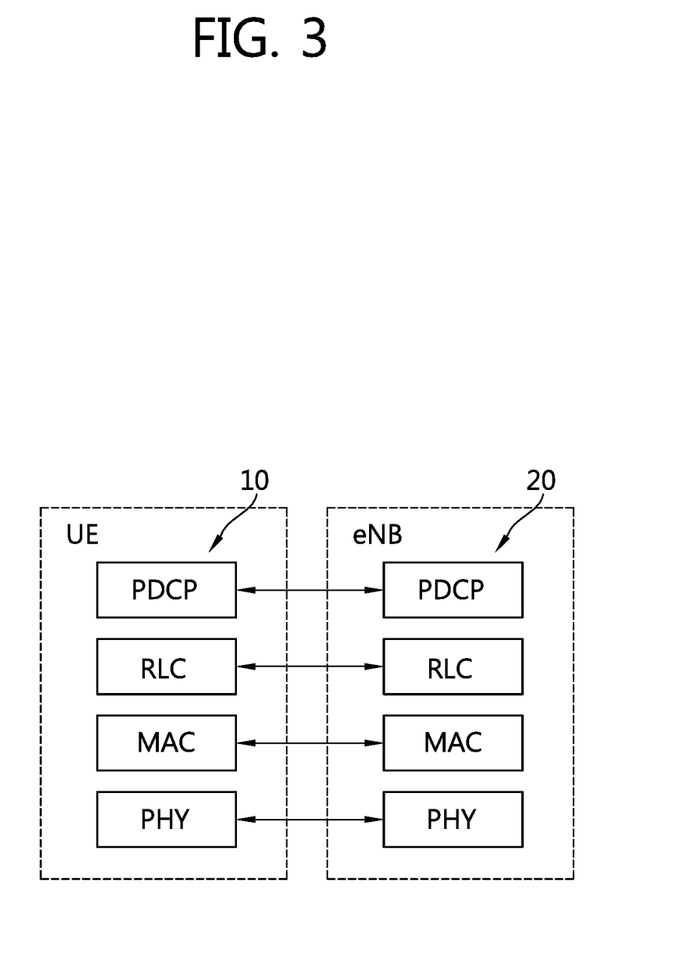
FIG. 3 shows a block diagram of a user plane protocol stack of an LTE system.
Figure 4:
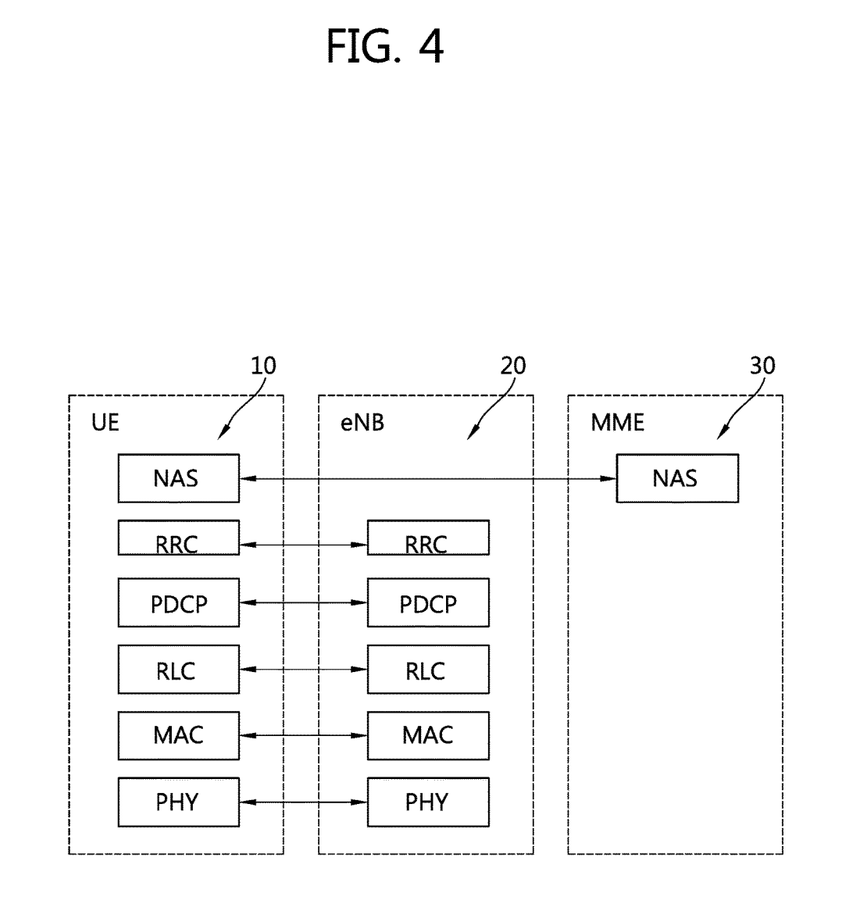
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
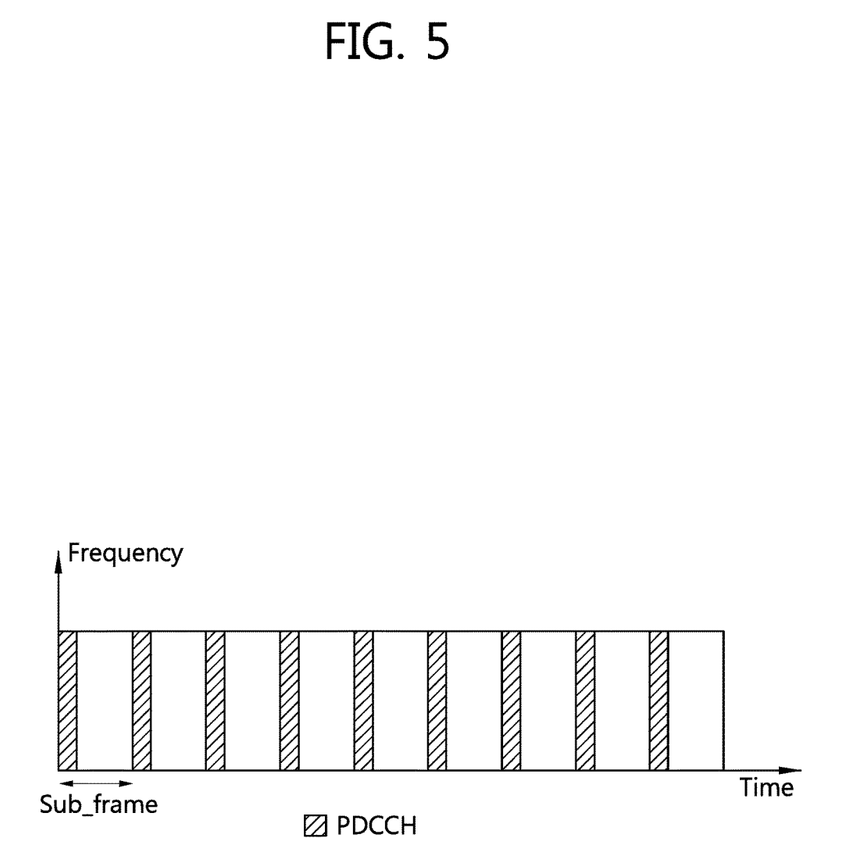
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Service specific access control (SSAC) in multimedia telephony (MMTEL) layer is described. It may be referred to Annex J.2.1.1 of 3GPP TS 24.173 V11.2.0 (March 2012). The following information is provided by lower layer:

BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.

Upon request from a user to establish a MMTEL communication session, the UE shall:

1> if the MMTEL communication session to be established is an emergency session, then skip the rest of steps below and continue with session establishment;

2> retrieve SSAC related information mentioned above from lower layers;

3> if video is offered in the multimedia telephony communication session:

A> if back-off timer Tx is running, reject the MMTEL communication session establishment and skip the rest of steps below; or B> else, then:

I> draw a new random number "rand1" that is uniformly distributed in the range 0≤rand1<1; and II> if the random number "rand1" is lower than BarringFactorForMMTEL-Video, then skip the rest of steps below and continue with session establishment;

III> else, then;

i> draw a new random number "rand2" that is uniformly distributed in the range 0≤rand2<1; and ii> start back-off timer Tx with the timer value calculated using the formula:

Tx=(0.7+0.6*rand2)*BarringTimeForMMTEL-Video; and iii> reject the multimedia telephony communication session establishment and skip the rest of steps below;

4> if audio is offered in the MMTEL communication session:

A> if back-off timer Ty is running, reject the MMTEL communication session establishment and skip the rest of steps below; or B> else, then;

I> draw a new random number "rand3" that is uniformly distributed in the range 0≤rand3<1; and II> if the random number "rand3" is lower than BarringFactorForMMTEL-Voice, then skip the rest of steps below and continue with session establishment;

III> else, then;

i> draw a new random number "rand4" that is uniformly distributed in the range 0≤rand4<1; and ii> start timer Ty with the timer value calculated using the formula:

Ty=(0.7+0.6*rand4)*BarringTimeForMMTEL-Voice; and iii> reject the multimedia telephony communication session establishment;

If the MMTEL communication implementation and the access stratum protocol implementation are located in separate physical entities, it is expected that the interconnecting protocol supports the transfer of information elements needed for the SSAC enforcement.

SSAC is not activated when the UE is in other radio accesses (e.g., UTRAN/GERAN). And when the UE camping on E-UTRAN moves to other radio accesses (e.g., UTRAN/GERAN), back-off timer (Tx or Ty or both) shall be stopped if running.

Handling of SSAC related parameters is described. It may be referred to Section 5.3.3.10 of 3GPP TS 36.331 V11.0.0 (June 2012). Upon request from the upper layers, the UE shall:

1> set the local variables BarringFactorForMMTEL-Voice and

BarringTimeForMMTEL-Voice as follows:

2> if the UE is in RRC_IDLE and ssac-BarringForMMTEL-Voice is present:

3> if the UE has one or more access classes (ACs), as stored on the universal subscriber identification module (USIM), with a value in the range 11 . . . 15, which is valid for the UE to use (ACs 12, 13, 14 are only valid for use in the home country and ACs 11, 15 are only valid for use in the home PLMN (HPLMN)/equivalent HPLMN (EHPLMN)), and 3> if, for at least one of these access classes, the corresponding bit in the ac-BarringForSpecialAC contained in ssac-BarringForMMTEL-Voice is set to zero:

4> set BarringFactorForMMTEL-Voice to one and BarringTimeForMMTEL-Voice to zero;

3> else:

4> set BarringFactorForMMTEL-Voice and BarringTimeForMMTEL-Voice to the value of ac-BarringFactor and ac-Barring Time included in ssac-BarringForMMTEL-Voice, respectively;

2> else set BarringFactorForMMTEL-Voice to one and BarringTimeForMMTEL-Voice to zero;

1> set the local variables BarringFactorForMMTEL-Video and BarringTimeForMMTEL-Video as follows:

2> if the UE is in RRC_IDLE and ssac-BarringForMMTEL-Video is present:

3> if the UE has one or more access classes, as stored on the USIM, with a value in the range 11 . . . 15, which is valid for the UE to use, and 3> if, for at least one of these access classes, the corresponding bit in the ac-BarringForSpecialAC contained in ssac-BarringForMMTEL-Video is set to zero:

4> set BarringFactorForMMTEL-Video to one and BarringTimeForMMTEL-Video to zero;

3> else:

4> set BarringFactorForMMTEL-Video and BarringTimeForMMTEL-Video to the value of ac-BarringFactor and ac-Barring Time included in ssac-BarringForMMTEL-Video, respectively;

2> else set BarringFactorForMMTEL-Video to one and BarringTimeForMMTEL-Video to zero;

1> forward the variables BarringFactorForMMTEL-Voice, BarringTimeForMMTEL-Voice, BarringFactorForMMTEL-Video and BarringTimeForMMTEL-Video to the upper layers;

Access class barring (ACB) check is described. It may be referred to Section 5.3.3.11 of 3GPP TS 36.331 V11.0.0 (June 2012).

1> if timer T302 or "Tbarring" is running:

2> consider access to the cell as barred;

1> else if SystemInformationBlockType2 includes "AC barring parameter":

2> if the UE has one or more ACs, as stored on the USIM, with a value in the range 11 . . . 15, which is valid for the UE to use (ACs 12, 13, 14 are only valid for use in the home country and ACs 11, 15 are only valid for use in the HPLMN/EHPLMN), and 2> for at least one of these valid Access Classes the corresponding bit in the ac-BarringForSpecialAC contained in "AC barring parameter" is set to zero:

3> consider access to the cell as not barred;

2> else:

3> draw a random number 'rand' uniformly distributed in the range: 0≤rand<1;

3> if 'rand' is lower than the value indicated by ac-BarringFactor included in "AC barring parameter":

4> consider access to the cell as not barred;

3> else:

4> consider access to the cell as barred;

1> else:

2> consider access to the cell as not barred;

1> if access to the cell is barred and both timers T302 and "Marring" are not running:

2> draw a random number 'rand' that is uniformly distributed in the range 0≤rand<1;
2> start timer "Marring" with the timer value calculated as follows, using the ac-BarringTime included in "AC barring parameter":

"Tbarring"=(0.7+0.6*rand)*ac-BarringTime.

The SystemInformationBlockType2 IE (hereinafter, SIB2) contains radio resource configuration information that is common for all UEs. Table 1 shows an example of the SIB2. The SIB2 includes parameters for the SSAC and ACB described above.

Additionally, the SIB2 may further include 3 bits of ACB skip bits. The first bit of the ACB skip bits may indicate whether or not to skip ACB in case that MMTEL voice call is initiated from the UE. The second bit of the ACB skip bits may indicate whether or not to skip ACB in case that MMTEL video call is initiated from the UE. The third bit of the ACB skip bits may indicate whether or not to skip ACB in case that short message service (SMS) is initiated from the UE. More specifically, if the network indicates that ACB is skipped for MMTEL voice via the SIB2, the RRC layer of the UE may skip ACB check before sending the RRC

TABLE 1

```
-- ASN1START
SystemInformationBlockType2 ::= SEQUENCE {
    ac-BarringInfo              SEQUENCE {
        ac-BarringForEmergency          BOOLEAN,
        ac-BarringForMO-Signalling      AC-BarringConfig        OPTIONAL, -- Need OP
        ac-BarringForMO-Data            AC-BarringConfig        OPTIONAL -- Need OP
    }                                                           OPTIONAL, -- Need OP
    radioResourceConfigCommon   RadioResourceConfigCommonSIB,
    ue-TimersAndConstants       UE-TimersAndConstants,
    freqInfo                    SEQUENCE {
        ul-CarrierFreq                  ARFCN-ValueEUTRA        OPTIONAL, -- Need OP
        ul-Bandwidth                    ENUMERATED {n6, n15, n25, n50, n75, n10
                                                                OPTIONAL, -- Need OP
        additionalSpectrumEmission      AdditionalSpectrumEmission
    },
    mbsfn-SubframeConfigList    MBSFN-SubframeConfigList OPTIONAL, -- Need OR
    timeAlignmentTimerCommon    TimeAlignmentTimer,
    ...,
    lateNonCriticalExtensio                         OCTET       STRING      (CONTAINING
SystemInformationBlockType2-v8h0-IEs)                           OPTIONAL, -- Need OP
    [[ ssac-BarringForMMTEL-Voice-r9        AC-BarringConfig    OPTIONAL, -- Need OP
       ssac-BarringForMMTEL-Video-r9        AC-BarringConfig    OPTIONAL -- Need OP
    ]],
    [[ ac-BarringForCSFB-r10                AC-BarringConfig    OPTIONAL -- Need OP
    ]]
}
SystemInformationBlockType2-v8h0-IEs ::= SEQUENCE {
    multiBandInfoList                       SEQUENCE    (SIZE   (1..maxMultiBands))     OF
AdditionalSpectrumEmission                                      OPTIONAL, -- Need OR
    nonCriticalExtension    SystemInformationBlockType2-v9e0-IEs OPTIONAL -- Need OP
}
SystemInformationBlockType2-v9eO-IEs ::= SEQUENCE {
    ul-CarrierFreq-v9e0         ARFCN-ValueEUTRA-v9e0   OPTIONAL, -- Cond ul-FreqMax
    nonCriticalExtension        SEQUENCE { }                        OPTIONAL -- Need OP
}
AC-BarringConfig ::=        SEQUENCE {
    ac-BarringFactor            ENUMERATED {
                                    p00, p05, p10, p15, p20, p25, p30, p40,
                                    p50, p60, p70, p75, p80, p85, p90, p95},
    ac-BarringTime              ENUMERATED {s4, s8, s16, s32, s64, s128, s256, s512},
    ac-BarringForSpecialAC      BIT STRING (SIZE(5))
}
MBSFN-SubframeConfigList ::=SEQUENCE (SIZE (1..maxMBSFN-Allocations)) OF
MBSFN-SubframeConfig
-- ASN1STOP
```

Referring to Table 1, the ac-BarringFactor field indicates a reference for ACB. If the random number drawn by the UE is lower than this value, access is allowed. Otherwise the access is barred. The ac-BarringForCSFB field indicates ACB for mobile originating (MO) circuit-switch (CS) fallback. The ac-BarringForEmergency field indicates ACB for AC 10. The ac-BarringForMO-Data field indicates ACB for MO calls. The ac-BarringForMO-Signalling field indicates ACB for MO signaling. The ac-BarringForSpecialAC field indicates ACB for AC 11-15. The first/leftmost bit is for AC 11, the second bit is for AC 12, and so on. The ac-Barring Time field indicates access barring time value in seconds. The ssac-BarringForMMTEL-Video field indicates SSAC for MMTEL video originating calls. The ssac-BarringForMMTEL-Voice field indicates SSAC for MMTEL voice originating calls.

connection request message to the network, upon receiving the service request message for MO MMTEL voice from the NAS layer of the UE. If the network indicates that ACB is skipped for MMTEL video, the RRC layer of the UE may skip ACB check before sending the RRC connection request message, upon receiving the service request message for MO MMTEL video from the NAS layer of the UE. If the network indicates that ACB is skipped for SMS, the RRC layer of the UE may skip ACB check before sending the RRC connection request message, upon receiving the service request message for MO SMS from the NAS layer of the UE.

Currently however, it is assumed that the RRC layer of the UE cannot know the type of MMTEL service/application. That is, even though the RRC layer of the UE knows for which type of MMTEL service/application ACB is skipped via the SIB2, the RRC layer of the UE cannot recognize MO MMTEL voice/video and MO SMS, when it receives the service request message from the NAS layer of the UE. The service request message does not distinguish the MO MMTEL voice/video and MO SMS from each other.

In order to solve the problem described above, that ACB is skipped for specific service/application needs to be indicated to the RRC layer of the UE. Hereinafter, a method for indicating skipping of ACB according to an embodiment of the present invention described. According to an embodiment of the present invention, a method for providing skipping ACB check for the specific application/service at an upper layer (i.e. IMS or MMTEL layer) of the UE may be provided.

Figure 6:
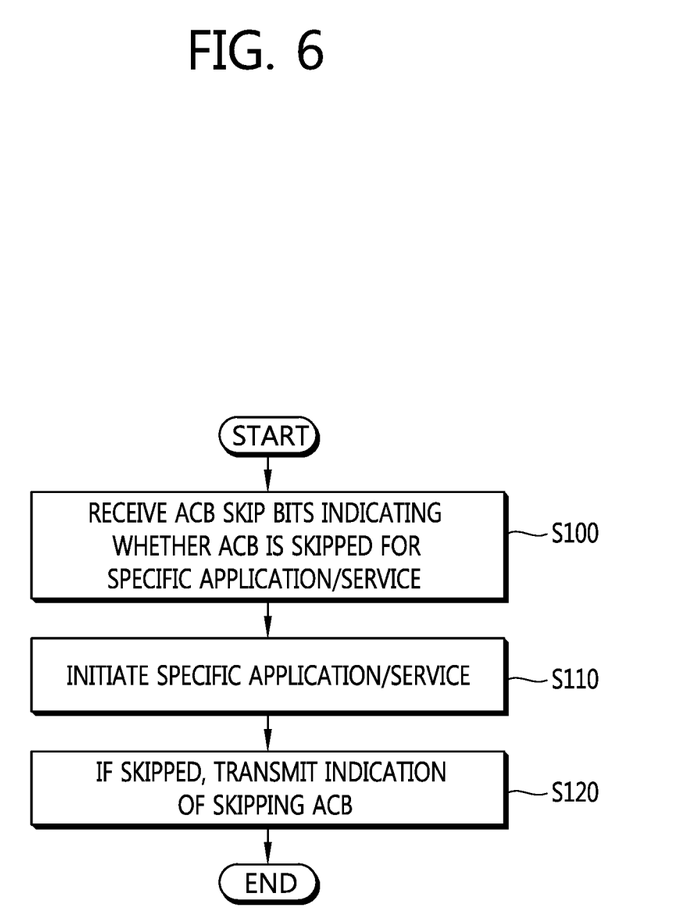
FIG. 6 shows an example of a method for indicating of skipping of ACB according to an embodiment of the present invention.

FIG. 6 shows an example of a method for indicating of skipping of ACB according to an embodiment of the present invention.

In step S100, the upper layer of the UE receives ACB skip bits, which indicates whether ACB check is skipped for a specific application or service (i.e. one of MO MMTEL voice, MO MMTEL video, MO SMS), from a lower layer of the UE. The ACB skip bits may be received via system information from the network (e.g. eNB). The upper layer of the UE may be the IMS/MMTEL layer of the UE. The lower layer of the UE may be the NAS/RRC layer of the UE. The UE may be in RRC_IDLE.

In step S110, the upper layer of the UE identifies initiation of the specific application/service (i.e. one of MO MMTEL voice initiation, MO MMTEL video initiation, and MO SMS initiation).

In step S120, the upper layer of the UE transmits the ACB skip indication to the lower layer of the UE, if skipping of the ACK check is allowed for the specific application or service according to the ACB skip bits. The ACB skip indication may indicate that the lower layer of the UE should skip the ACB check when the service request/RRC connection establishment procedure is initiated. The lower layer of the UE may skip ACB check only if the service request/RRC connection establishment procedure may set the establishment cause as one or more specific values such as 'MO data' and 'High Priority Access'.)

Alternatively, the upper layer of the UE may transmit the ACB skip indication to the lower layer of the UE, if skipping of the ACK check is not allowed for the specific application or service according to the ACB skip bits. The ACB skip indication may indicate that the lower layer of the UE should not skip the ACB check when the service request/RRC connection establishment procedure is initiated.

Alternatively, the upper layer of the UE may transmit the ACB skip indication to the lower of the UE, upon identifying stop of the specific application/service. The ACB skip indication may indicate that the lower layer of the UE should not skip the ACB check when the service request/RRC connection establishment procedure is initiated.

Figure 7:
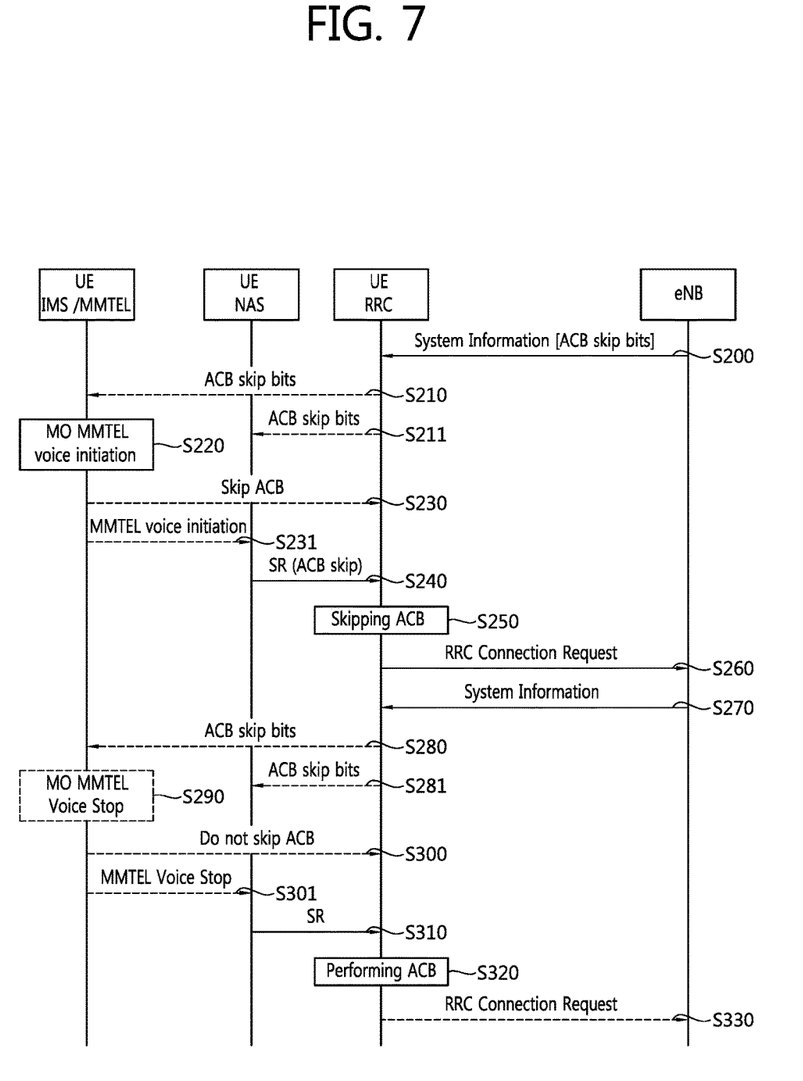
FIG. 7 shows an example of a method for performing a RRC connection establishment procedure for MO MMTEL voice according to an embodiment of the present invention.

FIG. 7 shows an example of a method for performing a RRC connection establishment procedure for MO MMTEL voice according to an embodiment of the present invention.

In step S200, the RRC layer of the UE receives system information (i.e. SIB2) including the ACB skip bits. The ACB skip bits may indicate whether or not ACB check should be skipped for MO MMTEL voice, MO MMTEL video and MO SMS. The ACK skip bits may be 3-bits. The first bit of the ACB skip bits may indicate whether or not to skip ACB for the MMTEL voice call. The second bit of the ACB skip bits may indicate whether or not to skip ACB for the MMTEL video. The third bit of the ACB skip bits may indicate whether or not to skip ACB for the MO SMS.

In step S210 and S211, upon receiving the ACB skip bits, and when the UE is in RRC_IDLE, the RRC layer of the UE may forward the ACB skip bits to the IMS/MMTEL layer or NAS layer of the UE. The ACB skip bits may be forwarded periodically according to the BCCH modification period.

In step S220, the IMS/MMTEL layer of the UE identifies initiation of a specific application/service, such as MO MMTEL voice, MO MMTEL video, or MO SMS. The IMS/MMTEL of the UE may inform the NAS/RRC layer of the UE of initiation of the specific application/service.

In step S230 and S231, upon receiving the valid ACK skip bits from the RRC layer of the UE and initiating the specific application/service, the IMS/MMTEL layer of the UE indicates to the RRC/NAS layer of the UE that ACB check should be skipped for the specific application/service according to the ACB skip bits. In this case, for MO MMTEL voice/video, IMS/MMTEL layer of the UE may indicate to the RRC/NAS layer of the UE that ACB check should be skipped for the MO MMTEL voice/video only if the MMTEL layer of the UE passes SSAC check for the MO MMTEL voice/video.

In step S240, upon identifying initiation of the specific application/service, the NAS layer of the UE transmits the service request message (with the establishment cause set to one of 'MO data', 'High Priority Access' and 'Emergency Access') to the RRC layer of the UE. Generally, the NAS layer of the UE may always transmit the service request message to the RRC layer of the UE (e.g. only for the specific establishment cause such as 'MO-data', 'High Priority Access' and 'Emergency Access'), regardless of indication of barring alleviation/applicability from the RRC layer of the UE. But according to an embodiment of the present invention, if the RRC layer of the UE previously indicates to the NAS layer of the UE that ACB is applicable due to ACB check, and only if IMS/MMTEL layer of the UE indicates to the NAS layer of the UE that ACB check should be skipped for the specific application/service, the NAS layer of the UE may transmit the service request message to the RRC layer of the UE. In other words, if the RRC layer of the UE previously indicates to the NAS layer of the UE that ACB is applicable due to ACB check, and if the IMS/MMTEL layer of the UE indicates to the NAS layer of the UE that ACB check should not be skipped for the specific application/service, the NAS layer of the UE may not transmit the service request message to the RRC layer of the UE.

Alternatively, if ACB check should be skipped for the specific application/service according to the ACB skip bits, the NAS layer of the UE may transmit the service request message with the indication of skipping ACB for the specific application/service to the RRC layer of the UE. Further, if ACB check should not be skipped for the specific application/service according to the ACB skip bits, the NAS layer of the UE may transmit the service request message without the indication of skipping ACB for the specific application/service to the RRC layer of the UE, in case that barring is not applicable in the RRC layer of the UE.

In step S250, upon receiving the service request message, the RRC layer of the UE initiates a RRC connection establishment procedure and may (or may not) skip ACB check in the RRC connection establishment procedure. Upon receiving the service request message with the indication of skipping ACB for the specific application/service, the RRC layer of the UE may skip ACB check in RRC connection establishment procedure. Upon receiving the service request message without the indication of skipping ACB for the specific application/service, the RRC layer of the UE may perform ACB check in the RRC connection establishment procedure. The RRC layer of the UE may skip ACB check whenever RRC connection establishment is performed for the establishment cause set to one of 'MO data', 'High Priority Access' and 'Emergency Access', until the IMS/MMTEL layer of the UE indicates to the RRC layer of the UE that ACB check should not be skipped. Further, the RRC layer of the UE may perform ACB check when the RRC connection establishment is performed for the establishment cause set to one of 'MT access' and 'Delay Tolerant Access', even if the IMS/MMTEL layer of the UE indicates to the RRC layer of the UE (or the NAS layer of the UE) that ACB check should be skipped.

In step S260, the RRC layer of the UE transmits the RRC connection request message after skipping ACB check.

In step S270, the RRC layer of the UE may receive updated system information with the updated ACB skip bits.

In step S280 and S281, upon receiving the updated ACB skip bits, and when the UE is in RRC_IDLE, the RRC layer of the UE may forward the updated ACB skip bits to the IMS/MMTEL layer or NAS layer of the UE.

In step S290, the IMS/MMTEL layer of the UE identifies stop of a specific application/service, such as MO MMTEL voice, MO MMTEL video, or MO SMS. The IMS/MMTEL of the UE may inform the NAS/RRC layer of the UE of stop of the specific application/service.

In step S300 and S301, If the ACB skip bits indicates that ACB check should not be skipped for the specific application/service, or if the specific application/service that has been initiated is stopped, the IMS/MMTEL layer of the UE may indicate to the RRC/NAS layer of the UE that ACB check should not be skipped.

In step S310, the NAS layer of the UE transmits the service request message to the RRC layer of the UE. Generally, the NAS layer of the UE may always transmit the service request message to the RRC layer of the UE (e.g. only for the specific establishment cause such as 'MO-data', 'High Priority Access' and 'Emergency Access'), regardless of indication of barring alleviation/applicability from the RRC layer of the UE. But according to an embodiment of the present invention, if the RRC layer of the UE previously indicates to the NAS layer of the UE that ACB is applicable due to ACB check, and only if IMS/MMTEL layer of the UE indicates to the NAS layer of the UE that ACB check should be skipped for the specific application/service, the NAS layer of the UE may transmit the service request message to the RRC layer of the UE. In other words, if the RRC layer of the UE previously indicates to the NAS layer of the UE that ACB is applicable due to ACB check, and if the IMS/MMTEL layer of the UE indicates to the NAS layer of the UE that ACB check should not be skipped for the specific application/service, the NAS layer of the UE may not transmit the service request message to the RRC layer of the UE.

Alternatively, for MMTEL voice/video and SMS, if the ACB skip bits indicates that ACB check should not be skipped for the specific application/service, or if the specific application/service that has been initiated is stopped, the NAS layer of the UE transmits the service request message without the indication of skipping ACB to the RRC layer of the UE, in case that barring is not applicable in the RRC layer of the UE.

In step S320, upon receiving the service request message, the RRC layer of the UE initiates the RRC connection establishment procedure and does not skip ACB check in the RRC connection establishment procedure. Upon receiving the service request message without the indication of skipping ACB, the RRC layer of the UE may initiate the RRC connection establishment procedure and performs ACB check in the RRC connection establishment procedure.

In step S330, the RRC layer of the UE may transmit the RRC connection request message in the RRC connection establishment procedure.

Figure 8:
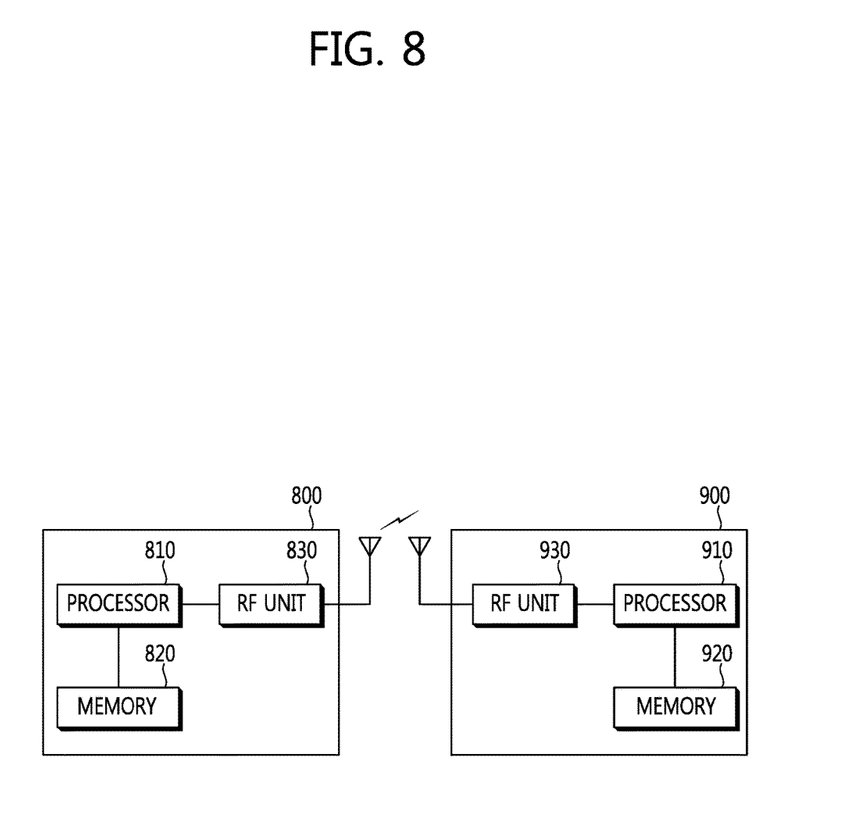
FIG. 8 shows a wireless communication system to implement an embodiment of the present invention.

FIG. 8 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for indicating, by a user equipment (UE), skipping of access class barring (ACB) check in a wireless communication system, the method comprising:
   receiving, by an upper layer of the UE, ACB skip bits which indicate whether the ACB check is skipped for a specific application or service, from a radio resource control (RRC) layer of the UE;
receiving, by a non-access stratum (NAS) layer of the UE, information that barring is applicable due to the ACB check, from the RRC layer of the UE;
initiating, by the upper layer of the UE, the specific application or service; and
when skipping of the ACB check is allowed for the specific application or service according to the ACB skip bits:
receiving, by the NAS layer of the UE, an ACB skip indication indicating that the ACB check is skipped for the specific application or service from the upper layer of the UE,
transmitting, by the NAS layer of the UE, a service request to the RRC layer of the UE, when the RRC layer of the UE informs the NAS layer of the UE that barring is applicable due to the ACB check, and when the NAS layer of the UE receives the ACB skip indication from the upper layer of the UE, and
skipping, by the RRC layer of the UE, the ACB check for the specific application or service, upon receiving the service request from the NAS layer of the UE;
when skipping of the ACB check is not allowed for the specific application or service according to the ACB skip bits:
receiving, by the NAS layer of the UE, an ACB non-skip indication indicating that the ACB check is not skipped for the specific application or service from the upper layer of the UE,
wherein when the RRC layer of the UE informs the NAS layer of the UE that barring is applicable due to the ACB check, and when the NAS layer of the UE receives the ACB non-skip indication from the upper layer of the UE, the NAS layer of the UE does not transmit the service request to the RRC layer of the UE.

2. The method of claim 1, wherein the specific application or service is one of a mobile originating (MO) MMTEL voice, a MO MMTEL video, or a MO short message service (SMS).

3. The method of claim 1, wherein the ACB skip bits are received from a network via system information.

4. The method of claim 1, wherein the ACB skip indication indicates that the NAS layer of the UE should skip the ACB check when a service request or an RRC connection establishment procedure is initiated.

5. The method of claim 1, wherein the upper layer of the UE is an Internet protocol multimedia subsystem (IMS) layer of the UE or a multimedia telephony (MMTEL) layer of the UE.

6. The method of claim 1, wherein the UE is in an idle mode.

7. The method of claim 6, wherein the ACB skip bits are received periodically according to a broadcast control channel (BCCH) modification period.

8. The method of claim 1, wherein the ACB non-skip indication indicates that the NAS layer of the UE should not skip the ACB check when a service request or an RRC connection establishment procedure is initiated.

9. A user equipment (UE) configured to indicate skipping of access class barring (ACB) in a wireless communication system, the UE comprising:
a transmitter and a receiver; and
a processor, operatively coupled to the transmitter and the receiver, that:
controls the receiver to receive, by an upper layer of the UE, ACB skip bits which indicate whether the ACB check is skipped for a specific application or service, from a radio resource control (RRC) layer of the UE;
controls the receiver to receive, by a non-access stratum (NAS) layer of the UE, information that barring is applicable due to the ACB check, from the RRC layer of the UE;
initiates, by the upper layer of the UE, the specific application or service; and
when skipping of the ACB check is allowed for the specific application or service according to the ACB skip bits:
controls the receiver to receive, by the NAS layer of the UE, an ACB skip indication indicating that the ACB check is skipped for the specific application or service from the upper layer of the UE,
controls the transmitter to transmit, by the NAS layer of the UE, a service request to the RRC layer of the UE, when the RRC layer of the UE informs the NAS layer of the UE that barring is applicable due to the ACB check, and when the NAS layer of the UE receives the ACB skip indication from the upper layer of the UE, and
skips, by the RRC layer of the UE, the ACB check for the specific application or service, upon receiving the service request from the NAS layer of the UE;
when skipping of the ACB check is not allowed for the specific application or service according to the ACB skip bits:
controls the receiver to receive, by the NAS layer of the UE, an ACB non-skip indication indicating that the ACB check is not skipped for the specific application or service from the upper layer of the UE,
wherein when the RRC layer of the UE informs the NAS layer of the UE that barring is applicable due to the ACB check, and when the NAS layer of the UE receives the ACB non-skip indication from the upper layer of the UE, the NAS layer of the UE does not transmit the service request to the RRC layer of the UE.

10. The UE of claim 9, wherein the specific application or service is one of a mobile originating (MO) MMTEL voice, a MO MMTEL video, or a MO short message service (SMS).

11. The UE of claim 9, wherein the ACB skip bits are received from a network via system information.

12. The UE of claim 9, wherein the ACB skip indication indicates that the NAS layer of the UE should skip the ACB check when a service request or a radio resource control (RRC) connection establishment procedure is initiated.

13. The UE of claim 9, wherein the upper layer of the UE is an Internet protocol multimedia subsystem (IMS) layer of the UE or a multimedia telephony (MMTEL) layer of the UE.

* * * * *